United States Patent
Williamson et al.

[11] Patent Number: 5,253,477
[45] Date of Patent: Oct. 19, 1993

[54] MASTER CYLINDER AND BOOSTER ASSEMBLIES

[75] Inventors: Michael Williamson, Glamorgan; Michael A. Taylor, Gwent, both of Wales

[73] Assignee: Lucas Industries Public Limited Company, Solihull, England

[21] Appl. No.: 877,291

[22] Filed: May 1, 1992

[30] Foreign Application Priority Data

May 3, 1991 [GB] United Kingdom ............. 9109615

[51] Int. Cl.⁵ .................... B60T 7/00; F15B 7/10
[52] U.S. Cl. .................................. 60/567; 60/585; 60/592; 60/547.1
[58] Field of Search ............... 91/369.1, 369.2, 370, 91/372, 376 R; 60/547.1, 550, 567, 581, 582, 585, 588, 589, 592

[56] References Cited

U.S. PATENT DOCUMENTS

| | | | |
|---|---|---|---|
| 2,958,198 | 11/1960 | Moyer | 60/585 |
| 4,015,881 | 4/1977 | Adachi | 60/550 X |
| 4,524,585 | 6/1985 | Coll et al. | 60/589 X |
| 4,771,605 | 9/1988 | Kytta | 60/589 X |

FOREIGN PATENT DOCUMENTS

| | | |
|---|---|---|
| 0340911 | 8/1989 | European Pat. Off. |
| 2082277 | 3/1982 | United Kingdom ............. 60/588 |
| 2121900 | 1/1984 | United Kingdom . |
| 2180899 | 4/1987 | United Kingdom . |

Primary Examiner—Edward K. Look
Assistant Examiner—Hoang Nguyen
Attorney, Agent, or Firm—Laff, Whitesel, Conte & Saret

[57] ABSTRACT

In a master cylinder and booster assembly for a vehicle hydraulic system, the booster has a housing provided with a bore, an inlet connected to a source of hydraulic pressure, and an outlet connected to a booster reservoir, input and boost pistons working in the bore and a boost chamber for pressurization by fluid from the source, under the control of valve means, to actuate the boost piston which in turn actuates the master cylinder. The booster has a permanent connection between the boost chamber and the outlet and a connection between the source and the boost chamber which is closed when the booster is inoperative and open during operation. In order to provide a supply of fluid for a master cylinder reservoir, the booster has a feed passage leading from the bore to the master cylinder reservoir and an overflow passage leading from that reservoir to the outlet. The master cylinder reservoir includes a partition separating it into an active part containing the feed and overflow passages, and a passive part containing an outlet port for connection to the master cylinder. The partition includes a passage allowing limited fluid flow between the active and passive parts.

12 Claims, 3 Drawing Sheets

MASTER CYLINDER AND BOOSTER ASSEMBLIES

This invention relates to master cylinder and booster assemblies for vehicle hydraulic systems of the kind where the booster has a housing provided with a bore, an inlet for connection to a source of hydraulic pressure, an outlet for connection to a reservoir for fluid, an input member and a boost piston working in the bore, a boost chamber defined in the bore behind the boost piston, pressurisation of the boost chamber by fluid from the source under control of valve means operative in response to an input load applied to the input member acting to advance the boost piston to generate an output load; and where the master cylinder has a housing provided with a bore, and piston means working in the master cylinder bore, and operative in response to the output load from the booster, to pressurise pressure space means to operate fluid-pressure operated means.

In assemblies of the kind set forth, the booster is often of the open centre type, being operated, together with other vehicle services, by a continuous flow of hydraulic fluid from the source, which may be a pump. However, the master cylinder is operated hydrostatically, and requires a reservoir of "stagnant" fluid. This may be difficult to provide satisfactorily from the fluid used to operate the booster, which is aerated by its continuous circulation, and so is not suitable for use in a hydrostatic system.

One known way of providing such a master cylinder reservoir in an assembly of the kind set forth, is found in EP-A-340911. In this assembly the booster is of the closed centre type when it is inoperative, but operates in an open centre mode. This is achieved by providing a permanent connection between the boost chamber and the outlet, and a connection means between the boost chamber and the pressure source. The connection means is closed when the booster is inoperative, so that the booster can be considered to be closed centre, but is open during operation of the booster, so that it operates as an open centre booster. In operation, there is a low rate of fluid flow in the bore ahead of the servo piston, resulting in low hydrodynamic but high hydrostatic pressure, and a higher fluid flow rate at the outlet, resulting in high hydrodynamic but low hydrostatic pressure. These flow rates are used to provide the supply for the master cylinder reservoir, by providing a feed passage connecting the bore of the booster to the master cylinder reservoir, and an overflow passage connecting the master cylinder reservoir to the booster outlet. The difference in hydrostatic pressure between the booster bore and the outlet enables flow to take place through the feed and overflow passages, but aeration of the fluid supplied is reduced as the flow is not continuous—it occurs only when the booster is operated—and because the feed comes from fluid flowing relatively slowly. Further, because the feed and overflow passages are adjacent each other, and above the outlet port or ports for connection to the master cylinder, the fluid flow tends to be confined to a small area at the top of the reservoir. Thus, any aerated fluid in the supply is removed by the overflow passage and does not affect the outlet port or ports. However, it has been found that prolonged use of the brakes, which results in prolonged fluid circulation, can set up fluid flow within the lower part of the reservoir, so that aerated fluid is in fact supplied to the master cylinder.

According to the present invention, in a master cylinder and booster assembly of the kind set forth, the booster has a permanent connection between the boost chamber and the outlet, and a connection means between the boost chamber and the source, the connection means being closed when the booster is inoperative, and open during operation of the booster, and the assembly includes a fluid reservoir for the master cylinder, feed passage means connecting the bore of the booster to the master cylinder reservoir, and overflow passage means connecting the master cylinder reservoir to the booster outlet, and partition means separating the master cylinder reservoir into an active part containing the discharge from the feed passage means and the inlet to the overflow passage means, and a passive part containing an outlet port or ports for connection to the master cylinder, the partition means including passage means allowing limited fluid flow between the active and passive parts.

Partitioning the master cylinder reservoir controls the fluid flow in the reservoir, so that aerated fluid in the supply stays in the active part, while the passive part remains stagnant for supplying the master cylinder. The passage means ensures that the passive part is kept full, but limits flow of aerated fluid from the active part.

The partition means may comprise a wall extending substantially the full depth of the reservoir. Preferably the passage means is provided at one or more relatively "still" points of the active part of the reservoir, limiting the flow of aerated fluid to a minimum. The passage means preferably comprises a single passage in the partition means.

Conveniently the discharge from the feed passage means and the inlet to the overflow passage means are in the upper part of the reservoir. The passage means in the partition means is also in the upper part of the reservoir. The outlet port or ports are preferably in the lower part of the reservoir, so that any aerated fluid which reaches the passive part of the reservoir through the passage means is unlikely to reach the outlet port or ports.

The booster inlet and outlet may be spaced axially and located at approximately the same circumferential position of the booster bore, with the feed passage means at a circumferential location spaced from the inlet and outlet.

The connection means preferably comprises two connections between the boost chamber and the source, both connections being closed when the booster is inoperative, and at least one being open during operation of the booster.

In a modification, the connection means comprises a single connection between the boost chamber and the source, the connection being closed when the booster is inoperative, and opened on movement of the boost piston in response to movement of the input member.

In an hydraulic braking system for an agricultural vehicle a twin master cylinder and booster assembly may be used. In this case a single master cylinder reservoir supplies both master cylinders. Each booster has a feed passage connecting the bore to the reservoir, and a single overflow passage is provided. The boosters preferably have a common inlet and a common outlet.

Some embodiments of our invention are illustrated by way of example in the accompanying drawings, in which.

Figure 1:
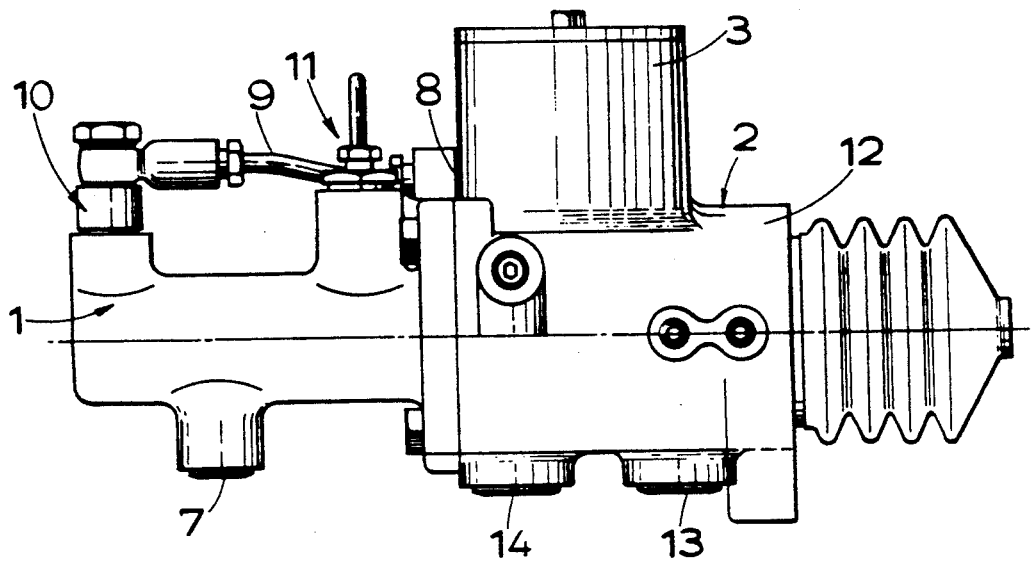
FIG. 1 is a side view of a twin master cylinder and booster assembly for a vehicle braking system.
Figure 2:
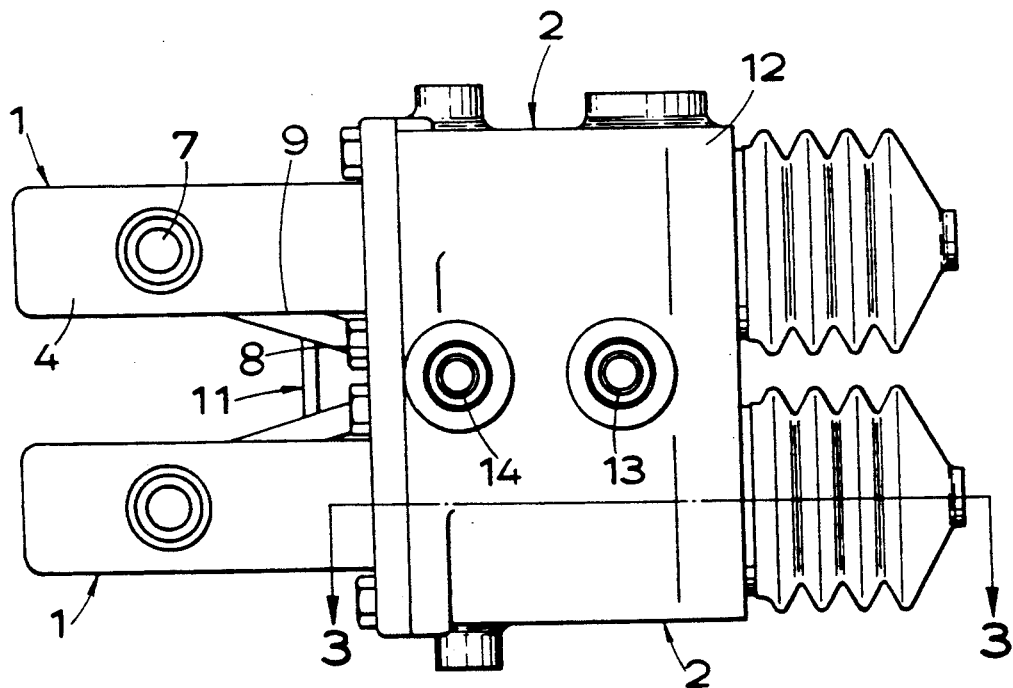
FIG. 2 is an underneath view of the assembly of FIG. 1.

The twin master cylinder and booster assembly shown in the drawings is designed for use in an hydraulic braking system for an agricultural vehicle such as a tractor, and comprises a pair of master cylinders 1, a pair of boosters 2, and a single reservoir 3 for the master cylinders 1. Each master cylinder 1 and corresponding booster 2 forms a sub-assembly.

Figure 3:
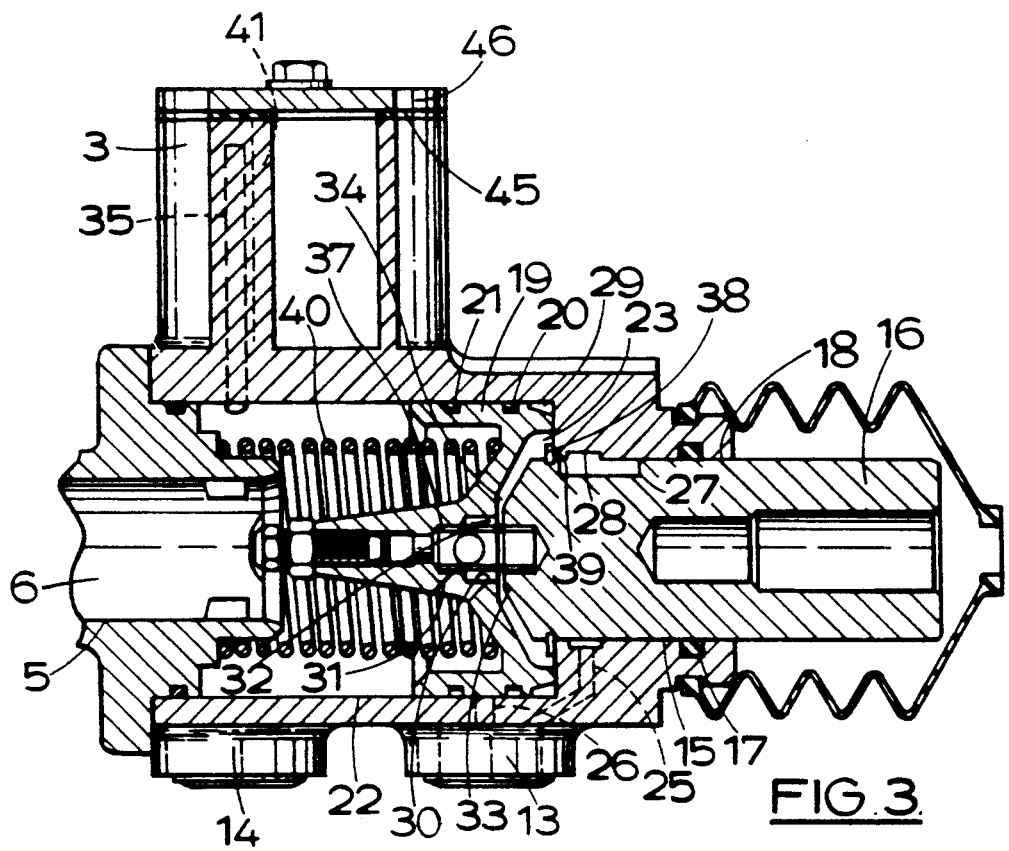
FIG. 3 is a section along the line 3—3 of FIG. 2.

The master cylinders 1 are not shown in detail but are of similar construction, being of the centre valve type. Each has a housing 4 provided with a bore 5 (see FIG. 3) in which works a piston 6 operative to pressurise a pressure space connected by an outlet port 7 to one or more vehicle brakes (not shown). The pressure space is connected to an outlet port 8 of the reservoir 3 by a pipe 9 and a recuperation port 10, this connection being controlled by a centre valve (not shown) controlled by the piston 6. The pressure spaces of the master cylinders 1 are interconnected by compensation means 11 of any suitable known type.

The boosters 2 are also similar in construction, being located in a common housing 12 which incorporates the master cylinder reservoir 3, a common inlet 13 for connection to a source of hydraulic pressure such as a pump (not shown) and a common outlet 14 for connection to a booster reservoir (not shown). Each booster 2 has a longitudinal stepped bore 15, with an input piston 16 working through a seal 17 in a bore portion 18 of smaller diameter, and a boost piston 19 carrying spaced seals 20, 21, working in a portion 22 of larger diameter. A boost chamber 23 is defined in the bore 15 behind the boost piston 19, pressurisation of the boost chamber 23 by fluid from the source acting to advance the boost piston 19 to actuate the master cylinder 1. The pressurisation of the boost chamber 23 is controlled by control valve means 24 operated in response to a load applied to the input piston 16.

The source is connected to the boost chamber 23 via the inlet 13 by two separate connections 25, 26, both connections being closed when the booster is inoperative. The first connection 25 leads from the inlet 13 to the bore portion 18, and communicates with the boost chamber 23 through a first normally-closed valve comprising an annulus 27 on the input piston 16 co-operating with an annulus 28 on the bore portion 18. The first valve opens when the input piston 16 is advanced. The second connection 26 leads from the inlet 13 to the bore portion 22, and communicates with the boost chamber 23 through a second normally-closed valve comprising an annulus 29 on the boost piston 19 co-operating with the bore portion 22. The second valve opens when the boost piston 19 is advanced. The boost chamber 23 is in permanent communication with the outlet 14 through axial and inclined passages 30, 31 in the boost piston 19, and the bore portion 22.

The control valve means 24 is formed by the first and second valves, together with a flow restricting valve 32 comprising a forward portion 33 of the input piston 16 co-operating with a seat 34 on the boost piston 19 round the passage 30.

Figure 4:
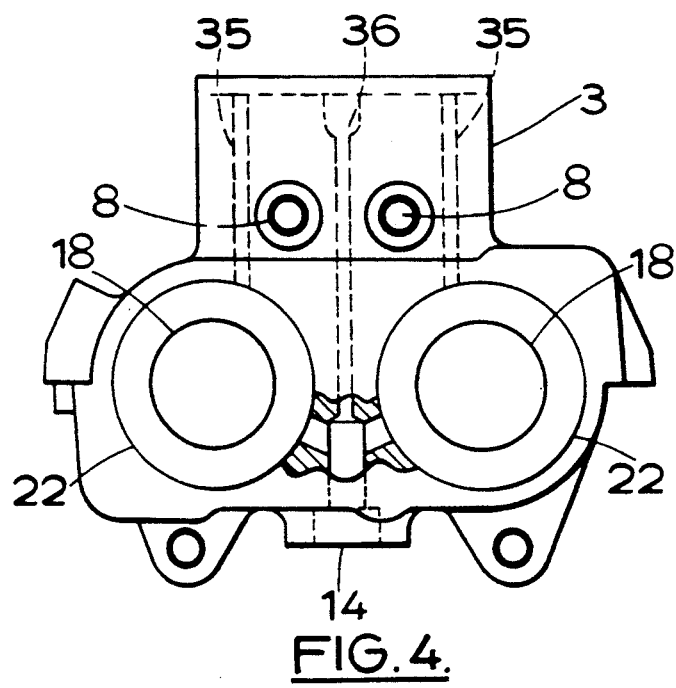
FIG. 4 is an end view, with part of the master cylinders removed.

The booster also has a feed passage 35 connecting the forward end of the bore portion 22 to the reservoir 3. As best seen in FIG. 4, the feed passage 35 leaves the bore portion 22 at a circumferential location spaced from the circumferential location of the inlet 13 and the outlet 14. The feed passages 35 from each booster 2 form feed passage means. Each discharges into the top of the reservoir 3, and the two passages 35 are spaced apart. Overflow passage means, in the form of a single overflow passage 36, is located between them, and leads from the top of the reservoir 3 to the common outlet 14.

Figure 5:
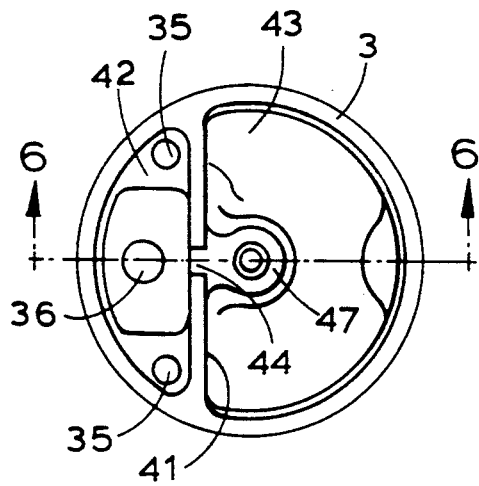
FIG. 5 is a top view of the master cylinder reservoir with its cover removed.
Figure 6:
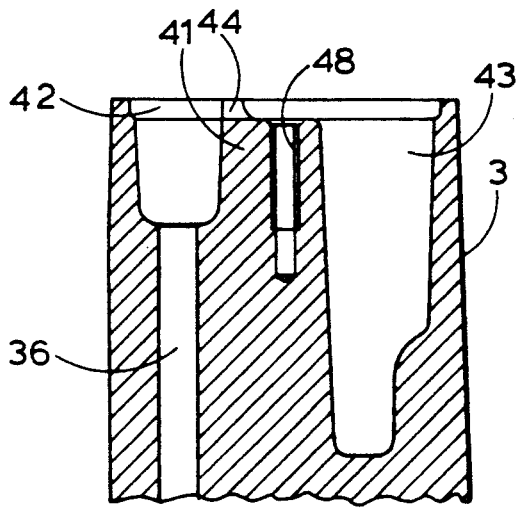
FIG. 6 is a section along the line 6—6 of FIG. 5.

As best seen in FIGS. 5 and 6 the reservoir 3 also has a partition 41 separating the reservoir into an active part 42 containing the discharge from the feed passages 35 and the inlet to the overflow passage 36, and a passive part 43 which contains the outlet ports 8. The partition 41 comprises a wall extending for substantially the full depth of the reservoir and has a small passage 44 located centrally and at the top of the partition 41 to allow limited fluid flow between the reservoir parts 42, 43. The reservoir 3 is completed by a gasket 45 and a cover 46. The partition 41 includes a central boss 47 provided with a screw thread 48 to accommodate a bolt (see FIG. 3) securing the cover 46 to the reservoir body. It will be noted that the bolt can be relatively short, thus providing a rigid and positive securing of the cover 46.

In each booster 2 the input piston 16 is biassed by a spring 37 into the retracted position shown, in which a circlip 38 on the piston 16 engages a shoulder 39 in the bore 15. The boost piston 19 is also biassed rearwardly by a spring 40.

It will be appreciated that the assembly is of the type where each sub-assembly can be operated separately, or both sub-assemblies can be operated together, and operation of one sub-assembly will now be described.

In operation, a load is applied to the input piston 16 from a pedal (not shown) to advance it against the force in the spring 37, and the forward portion 33 restricts the passage 30. This movement opens the first valve, allowing fluid to flow from the inlet 13 to the booster chamber 23 through the first connection 25. Fluid also flows to the outlet 14, but the restriction of the passage 30 allows pressure to build up in the boost chamber 23. This advances the boost piston 19 against the force in the spring 40, to actuate the master cylinder 1, pressurising the pressure space to apply the brakes. The compensation means 11 closes off the connection to the other, non-operated master cylinder 1.

As the boost piston 19 advances the second valve opens to permit fluid flow into the boost chamber 23 through the second connection 26. The input piston 16 advances with the boost piston 19 and may reach a point, after the second valve has opened, at which the first valve closes again. When the reaction force generated by the boost pressure acting on the input piston 16 equals the applied load, the input and boost pistons separate slightly, and the booster is then in its balanced position.

At any point during operation, the total pressure in the booster is constant, but the component hydrodynamic and hydrostatic pressures vary. Thus, there is a low rate of fluid flow in the bore portion 22, resulting in low hydrodynamic but high hydrostatic pressure, and a higher flow rate at the outlet 14, resulting in high hydrodynamic but low hydrostatic pressure. The resulting hydrostatic pressure differential allows fluid to flow through the feed passage 35 to the reservoir 3, and through the overflow passage 36 to the outlet 14. This flow tops up the reservoir 3, and although the feed is taken from fluid which is circulated in the booster, the arrangement is such that any aeration of the fluid does not affect the reservoir 3. Aeration is in any case reduced as the feed is taken from fluid which is flowing relatively slowly, and flow of fluid in the reservoir 3 is controlled by the partition 41, so that flow occurs only within the active part 42 at the top of the reservoir, between the feed and overflow passages. The passage 44 allows flow into the passive part 43, but this flow is limited, and the passage 44 is located at a relatively still point of the active part 42, so that flow of aerated fluid into the passive part 43 is substantially prevented. Thus, any aerated fluid coming into the reservoir 3 will tend to remain in the active part 42, and then be removed by the overflow passage, and will not affect the reservoir outlets 8.

When the input load on the piston 16 is reduced the boost pressure and the spring 37 act to move the input piston 16 rearwardly, opening the valve 32 to allow more flow through passage 30, thus reducing the boost pressure. The boost piston 19 is then moved rearwardly by the spring 40 and the reaction from the master cylinder 1. If the input load is reduced but not removed totally, the booster adopts a new balanced position; otherwise, the parts return to the retracted positions shown.

If both sub-assemblies are operated together, the boosters 2 operate in the same way, with the reservoir 3 fed by both feed passages 35. In this case the compensation means 11 operates to connect the pressure spaces of the master cylinders 1 in order to compensate for differential brake operation.

The booster shown in FIGS. 1 to 6 is relatively expensive to manufacture, as it requires two inlet connections in the housing, which involve cross-drillings, and spool valve portions of the input piston and the bore, to provide the inlet valve for the first inlet, and these require precision manufacture.

Figure 7:
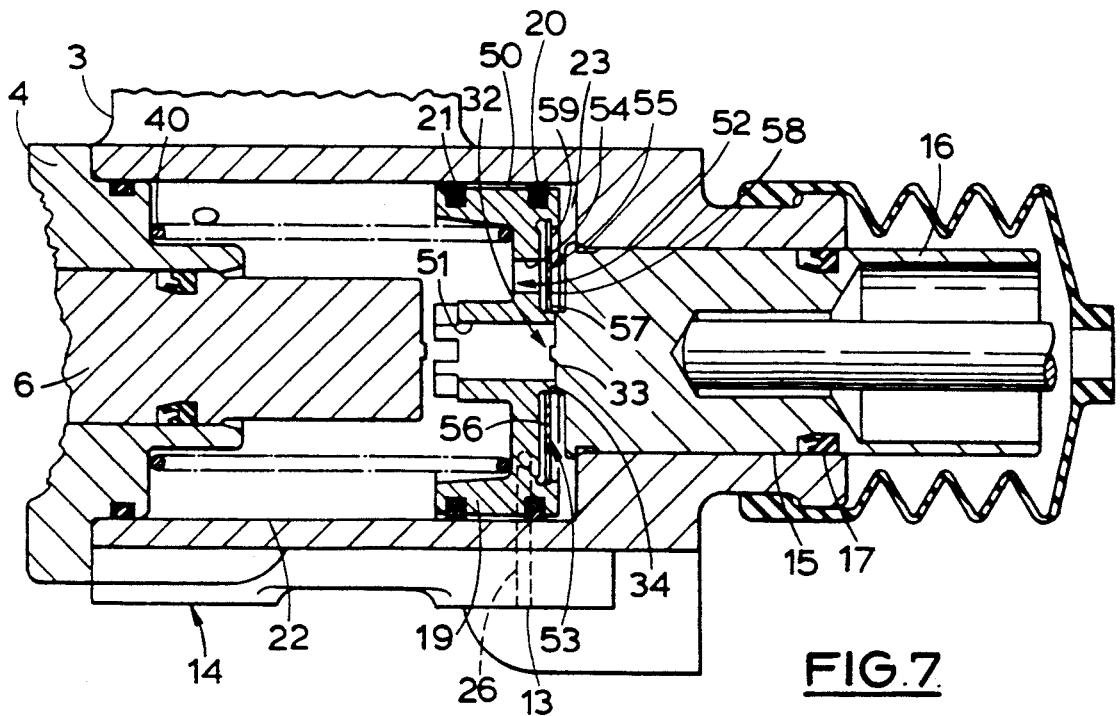
FIG. 7 is a longitudinal section through a modified booster.

The booster of FIG. 7 is modified to overcome these disadvantages and has a single inlet and valve means. Corresponding reference numerals have been applied to corresponding parts.

Thus, in FIG. 7, only the connection 26 is provided, the connection 25 not being required. The annuli 27 and 28 are therefore omitted, so that the bore portion 15 and the input piston 16 are easier and cheaper to manufacture. The inlet valve is also modified, and comprises the rearward seal 20 on the boost piston 19 controlling communication between the connection 26 and the boost chamber 23. The valve is closed when the booster is inoperative, and opens on movement of the boost piston 19. The forward seal 21 is provided between the connection 26 and the outlet 14, and has a leak path (not shown) to allow slight flow of fluid from the connection 26 to the outlet 14. The seals 20, 21 each comprise a PTFE sealing ring backed by a rubber O-ring, the seal 21 having a groove (not shown) in the PTFE ring to provide the leak path. These seals are particularly suitable for use in high pressure systems, as they have low hysteresis characteristics, and they also have good wear characteristics, so that the seal 20 will not be readily damaged, even though it passes over the connection to open and close the inlet valve. Furthermore, these seals 20, 21 also have a tolerance to relatively large radial clearances, without extruding under high pressures.

Thus there can be a relatively high diametral clearance, perhaps 0.5 mm, between the boost piston 19 and the bore portion 22 without affecting the operation of the seals 20, 21. In fact, a high pressure annulus 50 will normally be defined round the boost piston 19 between the seals 20, 21, and the leak path in the seal 21 is provided to ensure that the pressure in the annulus 50 does not become excessive, for example due to thermal expansion of the fluid, as this could result in failure of the boost piston 19 to operate properly.

The flow restricting valve 32 again comprises the forward portion 23 on the input piston 16 cooperating with the seat 34 on the boost piston 19, but the seat 34 surrounds a central through-bore 51 in the piston 19. The boost piston 19 is further modified due to the single inlet connection 26. As well as the bore 51 connecting the boost chamber 23 and bore portion 22, there is a further connection, in the form of passage means 52, with one-way valve means 53 which allows flow from the bore portion 22 to the boost chamber 23.

The passage means 52 in the boost piston 19 comprises a plurality of circumferentially-spaced longitudinal apertures 54. The one-way valve means 53 has a valve member 55 adapted to control fluid flow through all the apertures 54. The valve member 55 comprises an annulus which floats in a recess 56 formed in the rear of the boost piston 19. The annulus 55 has a central aperture 57 accommodating the seating portion 34 of the boost piston 19, a solid sealing portion 58 adapted to engage with the apertures 54, and a slotted outer portion 59 which allows fluid flow when the valve means 53 is open. The annulus 55 closes the apertures 54 when the pressure in the boost chamber 23 exceeds that in the bore portion 22, but otherwise allows flow. The remainder of the construction of the assembly is the same as that of FIGS. 1 to 6.

In operation, application of a load from the pedal advances the input piston 16 and the boost piston 19 together against the force in the spring 40. Initial movement of the boost piston 19 increases the volume of the boost chamber 23, tending to create a void, and also starts to generate pressure in the bore portion 22. The resulting pressure differential causes fluid to flow from the portion 22 to the chamber 23 through the apertures 54 and past the open valve member 55. The pressure in the bore portion 22 is reduced, while the void in the boost chamber 23 starts to fill.

Further movement of the boost piston 19 then opens the inlet valve, allowing fluid from the inlet 13 into the boost chamber 23, to start to pressurise it. Once the pressure in the boost chamber 23 exceeds that in the bore portion 22 the one-way valve 53 closes. Pressurisation of the boost chamber 23 advances the boost piston 19, and the flow restricting valve 32 operates to control flow through the bore 51, controlling the boost pressure in accordance with the input load. The pressure in the boost chamber 23 also acts on the input piston 16 to provide a reaction, or feel, at the pedal. This reaction starts with the initial fluid flow into the boost chamber 23, and because of the initial flow there is then a smooth transition when the inlet valve opens, with little or no "kick-back" to the operator.

The remainder of the operation, and in particular the supply of fluid to the reservoir 3 is the same as that of FIGS. 1 to 6.

We claim:
1. A master cylinder and booster assembly for a vehicle hydraulic system, wherein said booster has a booster housing, said housing being provided with a booster bore, an inlet for connection to a source of hydraulic pressure, an outlet for connection to a reservoir for fluid, with an input member and a boost piston working in said booster bore, a boost chamber defined in said booster bore behind said boost piston, and valve means operative in response to an input load applied to said input member, operation of said valve means controlling pressurisation of said boost chamber by fluid from said source, said pressurisation of said boost chamber acting to advance said boost piston to generate an output load, said booster having a permanent connection between said boost chamber and said outlet and a connection means between said boost chamber and said source, said connection means being closed when said booster is inoperative and open during operation of said booster; and wherein said master cylinder has a master cylinder housing provided with a master cylinder bore, and piston means working in said master cylinder bore, said piston means being operating in response to said output load from said booster to pressurise pressure space means to operate fluid-pressure operated means; and wherein said assembly includes a fluid reservoir for said master cylinder, feed passage means connecting said booster bore to said master cylinder reservoir and overflow passage means connecting said master cylinder reservoir to said booster outlet, and partition means separates said master cylinder reservoir into an active part containing the discharge from said feed passage means and the inlet to said overflow passage means, and a passive part containing an outlet port or ports for connection to said master cylinder, said partition means including passage means allowing limited fluid flow between said active and passive parts.

2. A master cylinder and booster assembly as claimed in claim 1, wherein said partition means comprises a wall extending substantially the full depth of said master cylinder reservoir.

3. A master cylinder and booster assembly as claimed in claim 1, wherein said passage means comprises a single passage in the partition means.

4. A master cylinder and booster assembly as claimed in claim 1, wherein said discharge from said feed passage means and said inlet to said overflow passage means are in the upper part of said master cylinder reservoir, and said outlet port or ports are in the lower part of said master cylinder reservoir.

5. A master cylinder and booster assembly as claimed in claim 1, wherein said passage means in said partition means is also in the upper part of said master cylinder reservoir.

6. A master cylinder and booster assembly as claimed in claim 1, wherein said booster inlet and said booster outlet are spaced axially and located at approximately the same circumferential position of said booster bore, with said feed passage means at a circumferential location spaced from said inlet and said outlet.

7. A master cylinder and booster assembly as claimed in claim 1, wherein said connection means comprises two connections between said boost chamber and said source, both said connections being closed when said booster is inoperative and at least one said connection being open during operation of said booster.

8. A master cylinder and booster assembly as claimed in claim 1, wherein said connection means comprises a single connection between said boost chamber and said source, said connection being closed when said booster is inoperative and opened on movement of said boost piston in response to movement of said input member.

9. A twin master cylinder and booster assembly for a vehicle hydraulic system, wherein each said booster has a booster housing provided with a booster bore, an inlet for connection to a source of hydraulic pressure, an outlet for connection to a reservoir for fluid, with an input member and a boost piston working in said booster bore, a boost chamber defined in said booster bore behind said boost piston, and valve means operative in response to an input load applied to said input member, operation of said valve means controlling pressurisation of said boost chamber by fluid from said source, said pressurisation of said boost chamber acting to advance said boost piston to generate an output load, each said booster having a permanent connection between said boost chamber and said outlet and a connection means between said boost chamber and said source, said connection means being closed when said booster is inoperative and open during operation of said booster; and wherein each said master cylinder has a master cylinder housing provided with a master cylinder bore, and piston means working in said master cylinder bore, said piston means being operative in response to said output load from one said booster to pressurise pressure space means to operate fluid-pressure operated means; and wherein said assembly includes a single fluid reservoir for both said master cylinders, feed passage means connecting at least one said booster bore to said master cylinder reservoir and overflow passage means connecting said master cylinder reservoir to at least one said booster outlet, and partition means separates said master cylinder reservoir into an active part containing the discharge from said feed passage means and the inlet to said overflow passage means, and a passive part containing outlet ports for connection to said master cylinders, said partition means including passage means allowing limited fluid flow between said active and passive parts.

10. A twin master cylinder and booster assembly as claimed in claim 9, wherein said feed passage means comprises a pair of feed passages, one said feed passage connecting each said booster bore to said master cylinder reservoir.

11. A twin master cylinder and booster assembly as claimed in claim 9 wherein said overflow passage means comprises a single overflow passage.

12. A twin master cylinder and booster assembly as claimed in claim 9, wherein said boosters have a single common inlet and a single common outlet.

* * * * *